United States Patent [19]

Vitaliev et al.

[11] 4,069,473
[45] Jan. 17, 1978

[54] ASSOCIATIVE MEMORY

[76] Inventors: Georgy Viktorovich Vitaliev, ulitsa Vavilova, 39, kv. 17, Moscow; Alexei Davidovich Gvinepadze, ulitsa Lva Tolstogo, 27, kv. 8, Moskovskaya oblast, Ljubertsy; Rem Vasilievich Smirnov, 3 mikroraion Teplogo Stana, korpus 32, kv. 36; Gury Dmitrievich Sofiisky, ulitsa Kazakova, 18, kv. 67, both of Moscow, all of U.S.S.R.

[21] Appl. No.: 732,202

[22] Filed: Oct. 14, 1976

[30] Foreign Application Priority Data

Oct. 28, 1975   U.S.S.R. ............................ 2181752

[51] Int. Cl.[2] ........................................... G11C 15/00
[52] U.S. Cl. .................................. 365/49; 365/190; 365/205
[58] Field of Search ..................... 340/173 AM, 173 R

[56] References Cited

U.S. PATENT DOCUMENTS

3,997,882  12/1976  Goyal .................. 340/173 AM

Primary Examiner—Stuart N. Hecker
Attorney, Agent, or Firm—Lackenbach, Lilling & Siegel

[57] ABSTRACT

This application discloses an associative memory designed to perform search and logical operations on attributive information presented in the form of multi-digit associative words or in the form of sets consisting of a given number of binary associative indications. The associative memory comprises an input register, an interrogation register, groups of coincidence circuits, groups of OR circuits, a mask register, an operation decoder and a data storage unit. The input register, the interrogation register and the mask register are made up of flip-flops. The number of flip-flops in the interrogation register and in the mask register, the number of said coincidence circuits and the number of said OR circuits are equal to the number of flip-flops of said input register, which is equal to the number of binary indications in said code of the first operand. Two coincidence circuits are in each group of such circuits, and two OR circuits are in each group of these circuits. Direct outputs of the mask register flip-flops are connected to inputs of the OR circuits in a respective group. Information transfer is controlled by the operation decoder. Arithmetic and parallel logical operations on the attributive information are performed by the data storage unit. Interrogation buses of the data storage unit are connected to outputs of the respective interrogation decoders, and control inputs of the data storage unit are connected to respective outputs of the operation decoder.

6 Claims, 4 Drawing Figures

ASSOCIATIVE MEMORY

The present invention relates to memory devices and, more particularly, to associative memories.

The invention can be used for performing arithmetic operations and parallel logical operations on large arrays of data.

Progress in modern computer technology has necessitated the development of memory devices able to store large arrays of data and to perform in these arrays, apart from searching data according to the attributes which are part of the basic data array, parallel logical and arithmetic operations on attributive information. In many cases such devices can practically completely replace the conventional binary data processing systems in which ordinary (address) memory devices are employed only to store information read from the device in accordance with the number (address) of a given unit of data in the array of data, the data processing functions being performed by the central control unit and the arithmetic and logical processing units making up a central processor. The achievements in microelectronics have resulted in the development of integrated associative memory elements; however, their characteristics, in particular, low information capacity on account of a high complexity of module organization, fail to meet modern requirements. For this reason, when designing high-capacity associative memory devices, it is expedient to use the available address memory modules the capacity of which is one or two orders higher than that of special-purpose associative elements. In this case the required functional flexibility of a device can be more easily attained by proper structural combination of memory modules rather than through excessively complex modifications in the structure of these modules.

Known in the art are memory devices built around non-associative memory elements, which comprise an input register having flip-flops divided into groups, an interrogation register also having flip-flops divided into groups, the number whereof being equal to the number of the input register flip-flops, groups of coincidence circuits, two coincidence circuits being in each group, the number of coincidence circuits being equal to the input register flip-flops, the first inputs of the first and the second coincidence circuits being connected, respectively, to a direct output and an inverse output of a respective input register flip-flop, and the outputs of the first and the second coincidence circuits being connected, respectively, to a direct input and an inverse input of a respective interrogation register flip-flop, interrogation decoders, groups of OR circuits, two OR circuits being in each group, the number of OR circuits being equal to the number of input register flip-flops, the first inputs of the first and the second OR circuits being connected, respectively, to the direct and to the inverse outputs of the respective interrogation register flip-flops, and their outputs being connected to the respective inputs of the interrogation decoders, a mask register provided with flip-flops in a number equal to the input register flip-flops which make up ring shift registers in a number equal to the number of groups of the input register flip-flops, the direct outputs of the mask register flip-flops being connected to the second inputs of the OR circuits in a respective group, an operation decoder with the first and the second outputs thereof connected to the second inputs of, respectively, the first and the second coincidence circuits of each group of the coincidence circuits, and a data storage unit with address memory modules arranged in the form of a matrix with the number of rows thereof equal to the number of groups of the input register flip-flops, the address buses of the address memory modules being electrically coupled to the outputs of the respective interrogation decoders.

These associative memory devices perform search operations on attributive information presented in the form of multi-digit associative words and stored in address memory modules which make up a matrix for performing parallel search operations and logical operations on attributive information stored in address memory modules and on information stored in the input register. The search operation is based on the principle of coincidence of the code of associative words with the interrogation code which is stored in the interrogation register and converted into the interrogation code of the address memory modules with the aid of the interrogation decoders. In the course of search operations any indication of the interrogation code and any combination of these codes can be eliminated by means of mask register flip-flops in which direct outputs control transfer of data from the outputs of the interrogation register flip-flops to the inputs of the interrogation decoders through respective OR circuits.

However, in the known associative memory devices arithmetic operations can be performed only as a sequence of a sufficiently large number of logical operations, such as modulo-2 addition and logical multiplication, and any logical operation can be performed simultaneously on the code of the first operand stored in the input register, and the code of only one arbitrary associative word.

It is an object of the present invention to improve the performance of the associative memory when performing logical and arithmetic operations.

It is another object of the invention to reduce the cost of data storage and processing in associative memory devices.

These objects are attained by an associative memory, which is designed to perform search and logical operations on attributive information presented in the form of multi-digit associative words or, to put it in a different way, in the form of sets of a plurality of binary associative indications, comprising: an input register serving to receive and store the code of the first operand, which is a given set of binary indications, and having flip-flops equal in number to the binary indications in the first operand code, the input register flip-flops being divided into groups; an interrogation register intended to receive and store the interrogation code in the form of a given set of binary indications and provided with flip-flops equal in number to the input register flip-flops, the interrogation register flip-flops being divided into groups whose number is equal to the number of groups of the input register flip-flops; groups of coincidence circuits the number of which is equal to that of the input register flip-flops, two coincidence circuits being in each group, first inputs of first and second coincidence circuits of each group being connected, respectively, to a direct output and an inverse output of a respective input register flip-flop, and outputs of the first and the second coincidence circuits being connected, respectively, to a direct input and an inverse input of a respective interrogation register flip-flop; interrogation decoders intended to convert the interrogation code;

groups of OR circuits in a number equal to the input register flip-flops, two OR circuits being in each group, first inputs of first and second OR circuits being connected, respectively, to direct and inverse outputs of respective flip-flops of the interrogation register, and their outputs being connected to respective inputs of the interrogation decoders; a mask register intended to receive and store the mask code in the form of a given set of binary indications, which shows the associative indications of the interrogation code irrelevant to the search operation to be performed, and provided with flip-flops equal in number to the input register flip-flops which make up ring shift registers the number of which is equal to that of the groups of the input register flip-flops, direct outputs of the mask register flip-flops being connected to the second inputs of the OR circuits in a respective group; an operation decoder used to control information transfer from the outputs of the input register flip-flops to the inputs of the respective flip-flops of the interrogation register in a direct or inverse code depending on the logical operation to be performed, first and second outputs of the operation decoder being connected to the second inputs of the first and second coincidence circuits, respectively, in each group of these coincidence circuits; and a data storage unit intended to perform arithmetic operations and parallel logical operations on attributive information and having interrogation buses connected to the outputs of respective interrogation decoders and control inputs connected to respective outputs of the operation decoder.

It is advisable that groups of the input register flip-flops should make up shift registers.

It is also advisable that a data storage unit for performing arithmetic operations and parallel logical operations on attributive information should comprise address memory modules forming a matrix to perform search and logical operations on attributive information stored in the address memory modules which have address buses for reading and writing data, output digit buses for data reading, a data writing control input, a data reading control input, an information input, and write digit buses in a number equal to the output digit buses, the number of rows in the matrix of the address memory modules being equal to the number of groups of the input register flip-flops, and the address buses of the address memory modules of each matrix row being connected via interrogation buses to the outputs of respective interrogation decoders, and that, according to the invention, it should also comprise modulo-2 adders for controlling the write digit buses of the address memory modules, and that the address memory modules of each matrix row should be divided into groups, two address memory modules being in each group, the output digit buses of one address memory module in a group being connected to the first inputs of the modulo-2 adders the outputs of which are connected to the like write digit buses of the other address memory module of the group, and the second inputs of the modulo-2 adders of a given matrix row, information inputs and the data writing and reading control inputs of the address memory modules of each column of the matrix being connected to the respective outputs of the operation decoder with the inputs thereof connected to the outputs of the respective input register flip-flops.

It is preferable that a data storage unit for performing arithmetic operations and parallel logical operations on attributive information should comprise address memory modules forming a matrix to perform search and logical operations on attributive information stored in the address memory modules which have address buses for reading and writing data, output digit buses for data reading, the number of rows in the matrix being equal to the number of groups of the input register flip-flops, detectors for detecting location of information with a given set of binary indications, the inputs of which are connected to the output digit buses of the address memory modules of a respective matrix column, an output register intended for receiving and storing information read out of respective address memory modules and having flip-flops equal in number to the input register flip-flops and divided into groups the number of which is equal to the number of groups of the input register flip-flops, multi-input OR circuits with the outputs thereof connected to the inputs of the respective flip-flops of the output register and their first inputs connected to the output digit buses of the address memory modules of a respective matrix row, groups of additional coincidence circuits in a number equal to the number of groups of the input register flip-flops, two coincidence circuits being in each group, first inputs of first and second additional coincidence circuits of each group being connected, respectively, to a direct output and an inverse output of the respective input register flip-flop, second inputs of these coincidence circuits being connected to respective outputs of an operation decoder, and outputs of the additional coincidence circuits being connected to the other inputs of the respective multi-input OR circuits, and shift registers for shifting the code at the outputs of the interrogation decoders equal in number to the groups of the input register flip-flops, the shift registers having flip-flops the number of which is equal to that of the outputs of the interrogation decoders, information inputs of the flip-flops in each shift register being connected to the like outputs of the respective interrogation decoders, the clock pulse inputs of the shift register flip-flops being connected to the respective control outputs of the input register, and the outputs of the flip-flops of the shift registers being connected to the address buses of the address memory modules of a respective matrix row.

It is also preferable that the groups of the output registers make up shift registers.

The present invention makes it possible to appreciably improve the characteristics of associative devices and, in particular, to increase several times their capacity without considerably raising the cost of the device due to the employment of modules for fast realization of arithmetic and logical operations.

The invention will be better understood from the following description of preferred embodiments thereof when read with reference to the accompanying drawings, in which.

Figure 1:
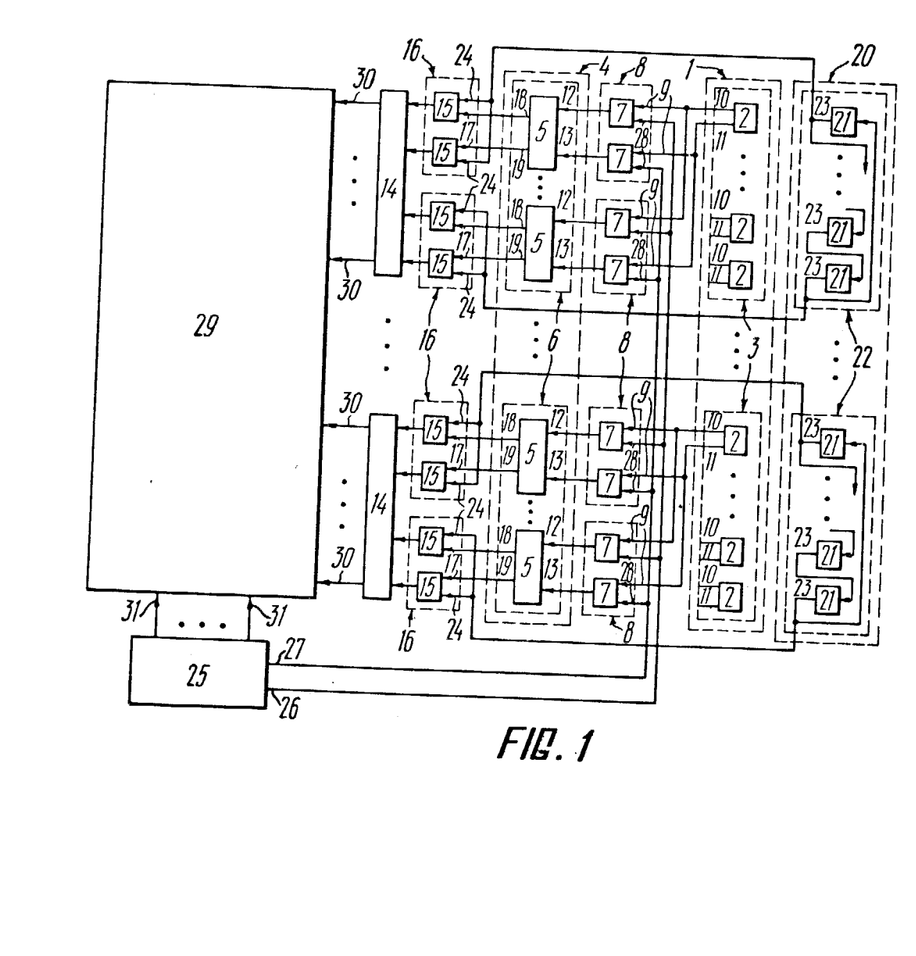
FIG. 1 is a block diagram of an associative memory, according to the invention.

The associative memory, which is designed to perform search and logical operations on attributive information presented in the form of multi-digit associative words or, to put it in a different way, in the form of sets of a plurality of binary associative indications, comprises an input register 1 (FIG. 1) intended to receive and store the code of the first operand, which is a given set of binary indications, and provided with flip-flops 2 equal in number to the binary indications in the first operand code, the input register flip-flops 2 being divided into groups 3. The memory also comprises an interrogation register 4 serving to receive and store the interrogation code in the form of a given set of binary indications and provided with flip-flops 5 equal in number to the flip-flops 2 of the input register 1, the interrogation register flips-flops 5 being divided into groups 6 whose number is equal to that of the groups 3 of the flip-flops 2 of the input register 1; and coincidence circuits 7 divided into groups 8, the coincidence circuits 7 being equal in number to the flip-flops 2 of the input register 1, two coincidence circuits 7 being in each group 8. First inputs 9 of the first and second coincidence circuits 7 of each group 8 are connected, respectively, to a direct output 10 and an inverse output 11 of the respective flip-flop 2 of the input register 1, and the outputs of the first and the second circuits 7 are connected, respectively, to a direct input 12 and an inverse input 13 of the respective flip-flop 5 of the register 4. In addition, the memory comprises interrogation decoders 14 for converting the interrogation code; OR circuits 15 divided into groups 16, the OR circuits 15 being equal in number to the flip-flops 2 of the register 1, two OR circuits 15 being in each group 16, first inputs 17 of the first and second OR circuits of each group being connected, respectively, to a direct output 18 and $a^n$ inverse output 19 of the respective flip-flops 5 of the register 4, and the outputs being connected to respective inputs of the decoders 14. The decoders 14 may be built of coincidence circuits, for example, in accordance with U.S. Pat. No. 3,913,075, cl. 340/173. A mask register 20 for receiving and storing the mask code, which is a given set of binary indications showing the interrogation code indications irrelevant to the search operation to be performed, has flip-flops 21 equal in number to the flip-flops 2 of the register 1 and making up ring shift registers 22 the number whereof is equal to the number of the groups 3 of the flip-flops 2 in the register 1. Direct outputs 23 of the flip-flops 21 of the register 20 are connected to second inputs 24 of the OR circuits 15 of the respective group 16. To enable transfer of information from the outputs of the flip-flops 2 of the input register 1 to the inputs of the respective flip-flops 5 of the interrogation register 4 in a direct or inverse code, depending on the logical operation to be performed, the memory is provided with an operation decoder 25, a first output 26 and a second output 27 being connected to second inputs 28 of, respectively, the first and the second coincidence circuits 7 of each group 8. According to the invention, the memory also comprises a data storage unit 29 intended for performing arithmetic operations and parallel logical operations on attributive information which has interrogation buses 30 connected to the outputs of the respective decoders 14 and control inputs 31 connected to the respective outputs of the decoder 25.

Figure 2:
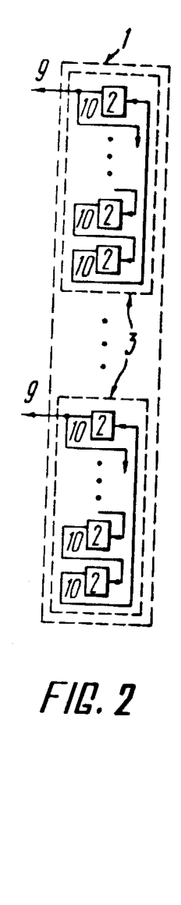
FIG. 2 is a block diagram of an embodiment of an input register, according to the invention.

FIG. 2 illustrates one concrete embodiment of the input register 1 in which the groups 3 of the flip-flops 2 make up shift registers.

Figure 3:
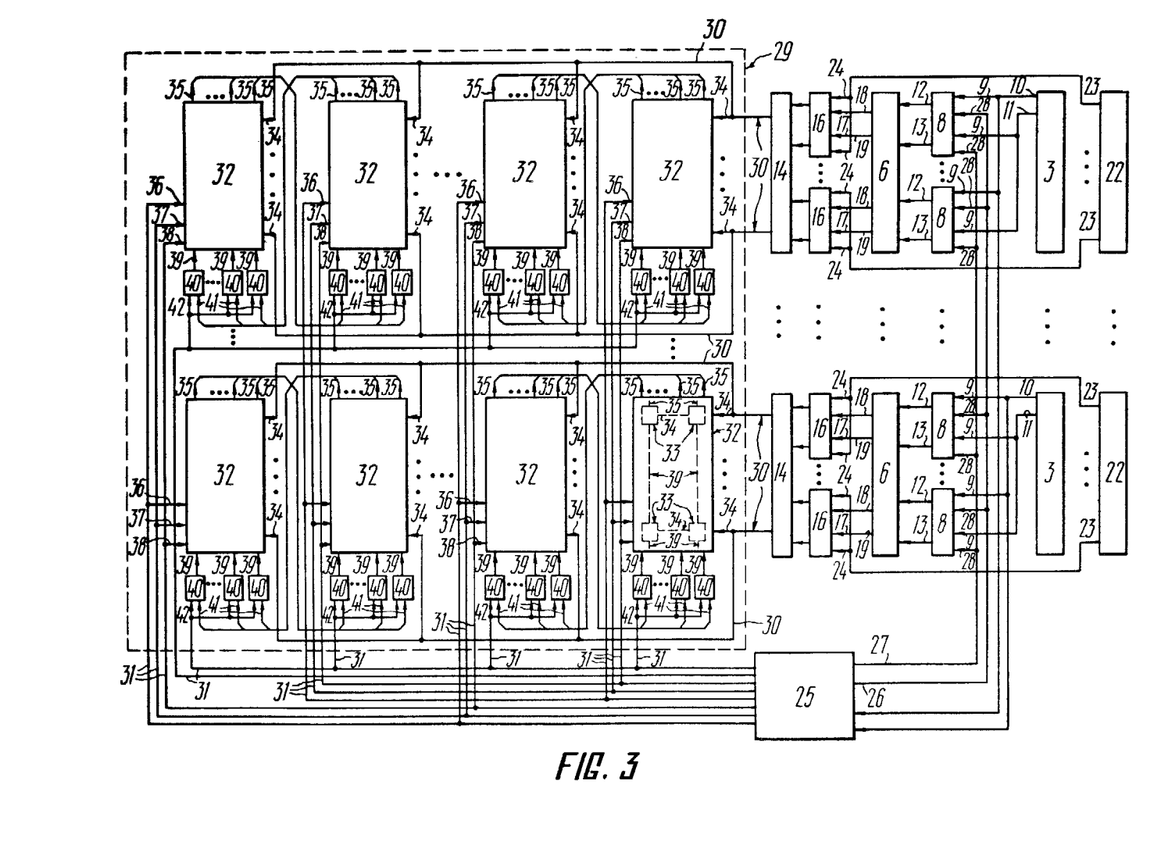
FIG. 3 is a block diagram of a memory which performs parallel logical operations on the codes of all associative words, according to the invention.

Another embodiment of a memory in which logical operations are performed in parallel on the codes of all the associative words is exemplified in FIG. 3. The memory comprises a data storage unit 29 intended to perform arithmetic operations and parallel logical operations on attributive information which has address memory modules 32 making up a matrix for performing search and logical operations on attributive information written in these modules 32. The modules 32 contain memory elements 33 for information storage, address buses 34 for data reading and writing, output digit buses 35 for data reading, a data writing control input 36, a data reading control input 37, an information input 38, and write digit buses 39. The memory elements 33 are connected electrically to the buses 34, 35 and 39 and to the inputs 36, 37 and 38. The number of the buses 39 of the module 32 is equal to the number of the buses 35 of this module, and the number of rows in the matrix of the modules 32 is equal to the number of the groups 3 of the register 1. The address memory modules 32 may be designed as microcircuits as described, for example, in U.S. Pat. No. 3,611,318, cl. 340/173. The address buses 34 of the modules 32 of each matrix row are connected via buses 30 to the outputs of the respective decoders 14. According to the invention, the data storage unit 29 also comprises modulo-2 adders 40 for controlling the buses 39 of the modules 32, the modules 32 of each row of the matrix being arranged in groups of two modules. The buses 35 of each module 32 in such a group are connected to first inputs 41 of the modulo-2 adders 40, the outputs of which are connected to the buses 39 of the other module 32 in the same group. Second inputs 42 of the modulo-2 adders 40 of the given matrix row, the data inputs 38, the inputs 36 and the inputs 37 of the modules 32 of each column of the matrix are connected to the respective outputs of the operation decoder 25, the inputs of which are connected to the outputs of the respective groups 3 flip-flops 2 of the input register 1.

Figure 4:
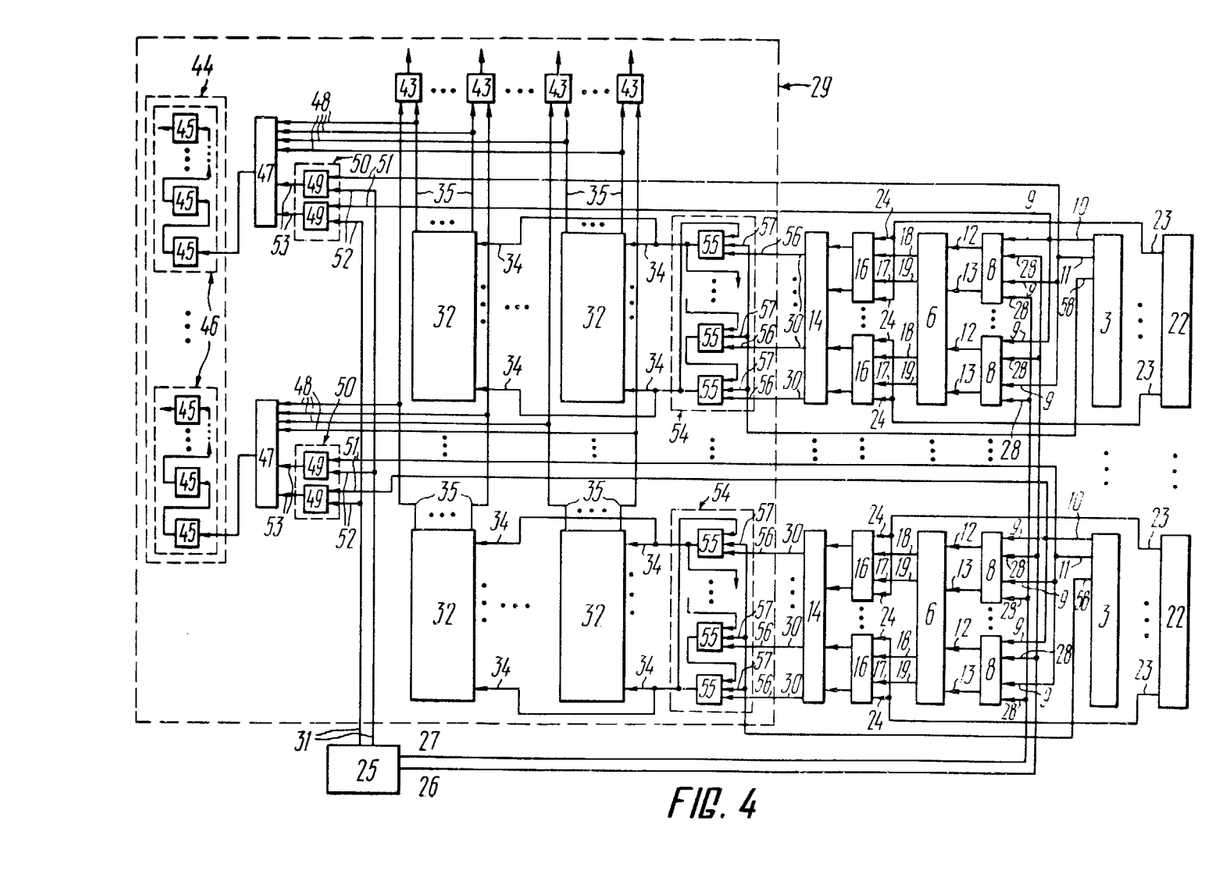
FIG. 4 is a block diagram of a memory which performs arithmetic operations, according to the invention.

Yet another embodiment of the memory which performs arithmetic operations is illustrated in FIG. 4. The memory comprises a data storage unit 29 for performing arithmetic operations and parallel logical operations which, similar to the previous embodiment shown in FIG. 3, has address memory modules 32 (FIG. 4) making up a matrix intended to perform search and logical operations on attributive information written in these modules 32. The modules 32 contain memory elements 33 for data storage, address buses 34 for data reading and writing, and output digit buses 35 for data reading. The memory elements 33 are electrically connected to the buses 34 and 35. The number of rows in the matrix of the modules 32 is equal to the number of the groups 3 of the flip-flops 2 in the input register 1. The data storage unit 29 also comprises detectors 43 for detecting the location of information with a given set of binary indications, the inputs of which are connected to the buses 35 of the modules 32 of the respective matrix column. An output register 44 for receiving and storing information read out of respective modules 32 is provided with flip-flops 45 in a number equal to the flip-flops 2 of the input register 1, which are divided into groups 46 of the flip-flops 45 in a number equal to that of the groups 3 of the flip-flops 2 in the input register 1. The memory also comprises multi-input OR circuits 47 with outputs connected to the inputs of the respective flip-flops 45 of the register 44 and first inputs 48 connected to the buses 35 of the modules 32 of the respective matrix row. The data storage unit 29 comprises additional coincidence circuits 49 arranged in groups 50 of the circuits 49 in a number equal to the groups 3 of the flip-flops 2 in the input register 1, two coincidence circuits 49 being in each group 50. First inputs 51 of the first and the second circuit 49 in each group 50 are connected, respectively, to a direct output 10 and an inverse output 11 of the respective flip-flop 2 of the register 1, second inputs 52 of the coincidence circuits 49 are connected to the respective outputs of the operation decoder 25, and the outputs of the coincidence circuits 49 are connected to other inputs 53 of the respective circuits 47. According to the invention, the data storage unit 29 also has shift registers 54 for shifting the code at the outputs of the decoders 14, the number of shift registers 54 being equal to the number of the groups 3 of flip-flops 2 in the input register 1. The registers 54 have flip-flops 55 in a number equal to the outputs of the decoders 14. Data inputs 56 of the flip-flops 55 in each register 54 are connected through the buses 30 to the like outputs of the respective decoder 14. Clock pulse inputs 57 of the flip-flops 55 in the registers 54 are connected to respective control outputs 58 of the register 1, and the outputs of the flip-flops 55 of the registers 54 are connected to the buses 34 of the modules 32 of the respective matrix row. In this case the groups 3 of the flip-flops 2 in the input register 1 may be designed as counters as described, for example, in U.S. Pat. No. 3,633,114, cl. 328/48.

It is advisable that the groups 46 of the flip-flops 45 in the register 44 be made as shift registers.

The operation of the memory in which logical operations are performed in parallel on the codes of all the associative words (FIG. 3) will be illustrated in concrete examples of the performance of logical operations in a group composed of two memory modules 32 (A and B) with eight address buses 34 and four output digit buses 35.

EXAMPLE 1

Consider a sequence of operations for performing inversion of an array of words stored in the module A. All the memory elements 33 of the module B are first set to the "1" state. The module A stores four words 011, 010, 001, 000 written in the memory elements 33 which are interconnected by its four buses 35 and four buses 39, in a "1" code against the background of "0". The code 110 is placed into the register 22 which is a mask register of these modules 32, and the first operand code 000 is written into the register 3. The "0" code delivered from the output 11 of the low-order digit flip-flop 2 of the register 3 to the inputs of the circuits 7 is used to reset the flip-flops 5 of the register 6 to "0". The interrogation code 000 and the mask code 110 come to the inputs of the circuits 15 and excite the even outputs 000, 010, 100, 110 of the decoder 14 and the respective buses 34 of both modules.

Table 1

| Decoder outputs | Module A 0 1 0 1 | buses 35 | Module B (before writing) | Module B (after writing) |
|---|---|---|---|---|
| 000 1 | 0 0 0 1 | | 1 1 1 1 | 1 0 1 0 |
| 001 0 | 0 0 1 0 | | 1 1 1 1 | 1 1 1 1 |
| 010 1 | 0 1 0 0 | | 1 1 1 1 | 1 0 1 0 |
| 011 0 | 1 0 0 0 | | 1 1 1 1 | 1 1 1 1 |
| 100 1 | 0 0 0 0 | | 1 1 1 1 | 1 0 1 0 |
| 101 0 | 0 0 0 0 | | 1 1 1 1 | 1 1 1 1 |
| 110 1 | 0 0 0 0 | | 1 1 1 1 | 1 0 1 0 |
| 111 0 | 0 0 0 0 | | 1 1 1 1 | 1 1 1 1 |
| | | buses 39 | 0 1 0 1 | |

A signal enabling data reading (for example, a logical "0") is applied to the input 36 of the module A, and a signal enabling data writing (for example, a logical "1") is applied to the input 36 of the module B. The inputs of both modules receive a signal enabling selection, and the input 38 of the module B receives a "0" signal. As a result, the read-out signals 0101 appear at the buses 35 of the module A. A "0" signal is applied to the inputs 42 of the adders 40 of the module B and, as a result, the signals 0101 appear at the write buses 39 of this module and the "0" code is written at the intersection of the second and fourth buses 39 and the even address buses 34 of the module B. The write operation is permitted when a "1" code is at the bus 39.

At the next clock pulse interval of the access operation the code in the register 3 is shifted by one step — 000, and the code in the register 22 is cyclically shifted — 101 which causes excitation of the 000, 001, 100, 101 outputs of the decoder 14. A "0" is written into the module B in the same way as at the first clock pulse interval, i.e. into the memory elements 33 at the intersection of the excited buses 34 and 39.

Table 2

| Decoder outputs | Module A 0 0 1 1 | buses 35 | Module B (before writing) | Module B (after writing) |
|---|---|---|---|---|
| 000 1 | 0 0 0 1 | | 1 0 1 0 | 1 0 0 0 |
| 001 1 | 0 0 1 0 | | 1 1 1 1 | 1 1 0 0 |
| 010 0 | 0 1 0 0 | | 1 0 1 0 | 1 0 1 0 |
| 011 0 | 1 0 0 0 | | 1 1 1 1 | 1 1 1 1 |
| 100 1 | 0 0 0 0 | | 1 0 1 0 | 1 0 0 0 |
| 101 1 | 0 0 0 0 | | 1 1 1 1 | 1 1 0 0 |
| 110 0 | 0 0 0 0 | | 1 0 1 0 | 1 0 1 0 |
| 111 0 | 0 0 0 0 | | 1 1 1 1 | 1 1 1 1 |
| | | buses 39 | 0 0 1 1 | |

At the third clock pulse interval the shifting of codes in the register 3 – 000 and register 22 – 011 causes the excitation of the 000, 001, 010, 011 outputs of the decoder 14. A "0" is written similar to the previous clock pulse intervals.

Table 3

| Decoder outputs | Module A 1 1 1 1 | buses 35 | Module B (before writing) | Module B (after writing) |
|---|---|---|---|---|
| 000 1 | 0 0 0 1 | | 1 0 0 0 | 0 0 0 0 |
| 001 1 | 0 0 1 0 | | 1 1 0 0 | 0 0 0 0 |
| 010 1 | 0 1 0 0 | | 1 0 1 0 | 0 0 0 0 |
| 011 1 | 1 0 0 0 | | 1 1 1 1 | 0 0 0 0 |
| 100 0 | 0 0 0 0 | | 1 0 0 0 | 1 0 0 0 |
| 101 0 | 0 0 0 0 | | 1 1 0 0 | 1 1 0 0 |
| 110 0 | 0 0 0 0 | | 1 0 0 0 | 1 0 1 0 |
| 111 0 | 0 0 0 0 | | 1 1 1 1 | 1 1 1 1 |
| | | buses 39 | 1 1 1 1 | |

At the fourth clock pulse interval the code 111 (inverse to the code 000) is placed into the register 3, and the code in the register 22 is cyclically shifted — 110 which excites the 001, 011, 101, 111 outputs of the decoder 14. At the fifth clock pulse interval the 010, 011, 110, 111 outputs of the decoder are excited, and at the sixth clock pulse interval the 100, 101, 110, 111 outputs of the decoder are excited. As a result, after the sixth clock pulse, the module B contains the following information:

Table 4

| Module B (after the sixth writing operation) |
|---|
| 0 0 0 0 |
| 0 0 0 0 |
| 0 0 0 0 |
| 0 0 0 0 |
| 1 0 0 0 |
| 0 1 0 0 |
| 0 0 1 0 |
| 0 0 0 1 | which in a conventional position code is equivalent to 100, 101, 110, 111, i.e. to the inverse codes of the initial words in the module A.

The rewriting of words in a direct code from the module A into the module B is similar to the above, except that the "1" code instead of the "0" code is applied to the second inputs 42 of the adders 40 of the module B from the output of the decoder 25, and this causes inversion of the information delivered from the buses 35 of the module A to the buses 39 of the module B.

The equivalence and non-equivalence operations (modulo-2 addition) of the first operand code with words written in the module A are replaced by the digit-by-digit operations of inversion or rewriting in a direct code, i.e. the combinations of the two operations which were considered at the beginning of this example. If the direct (inverse) code of the operand in the register 30 3 contains "1" ("0") in a given digit, the equivalence operation involves rewriting of data from the module A into the module B in a direct code, and the non-equivalence operation involves digit-by-digit inversion of the contents of the module A. The replacement of "1" by "0" results in the replacement of the rewriting operation by the inversion operation. Consider now an example of the modulo-2 addition operation.

is 110 and is replaced by the inverse code — 001 at the fourth clock pulse interval, other operations with the registers 3, 6 and 24 being performed in the same way as in example 1. The difference is that if the direct (inverse) code of the first operand contains "0" ("1") in a given digit, reading from the module A at an appropriate clock pulse interval is blocked by a reading inhibit signal applied to the input 37 of this module. In the operation with a direct (inverse) operand code, a logical "0" (logical "1") signal must be applied to the inputs 42 of the adders 40 in the module B. In case a given digit of the direct (inverse) code of the first operand contains "1" ("0"), the information is rewritten in a direct code from the module A into the module B. Below is given the states diagram at different clock pulse intervals:

Table 6

| Module A | Module B | | | | | | |
|---|---|---|---|---|---|---|---|
| | Clock pulse 0 | Clock pulse 1 | Clock pulse 2 | Clock pulse 3 | Clock pulse 4 | Clock pulse 5 | Clock pulse 6 |
| 0 0 0 1 | 1111 | 1111 | 1111 | 1111 | 1111 | 0011 | 0011 |
| 0 0 1 0 | 1111 | 1111 | 1111 | 1111 | 0000 | 0000 | 0000 |
| 0 1 0 0 | 1111 | 1111 | 1100 | 1100 | 1100 | 1100 | 1100 |
| 1 0 0 0 | 1111 | 1111 | 1100 | 1100 | 0000 | 0000 | 0000 |
| 0 0 0 0 | 1111 | 1111 | 1111 | 0000 | 0000 | 0000 | 0000 |
| 0 0 0 0 | 1111 | 1111 | 1111 | 0000 | 0000 | 0000 | 0000 |
| 0 0 0 0 | 1111 | 1111 | 1100 | 0000 | 0000 | 0000 | 0000 |
| 0 0 0 0 | 1111 | 1111 | 1100 | 0000 | 0000 | 0000 | 0000 |

The peculiar feature of the logical addition operation is that the presence of a "1" in the direct code of the first operand inhibits rewriting of information from the module A into the module B, while the presence of a "0" is equivalent to rewriting in a direct code from the module A into the module B. All other logical operations are performed as combinations of the above operations. Successive logical operations are performed one by one on the contents of the module A and the module B. An increase in the number of word digits in logical processing is attained by simply increasing the number of rows in the matrix of the modules 32; the number of associative words to be processed is increased by increasing the number of columns in the matrix of the modules 32. The number of clock pulse intervals during the processing procedure remains constant and equals the number of memory elements 33 connected to one bus 35 (or 39) of the modules 32.

The operation of the memory which performs arithmetic operations (FIG. 4) will be illustrated by a concrete example of an addition operation.

EXAMPLE 2

Assume that the first operand code 101 is placed in the register 3 and that the module A contains the same information as in example 1. The contents of the register 22 are changed as in the preceding example. At the fourth clock pulse interval the inverse code of the first operand — 010 is written into the register 3. The successive states of the module B at different clock pulse intervals are given in the states diagram:

Table 5

| Module A | Module B | | | | | | |
|---|---|---|---|---|---|---|---|
| | Clock pulse 0 | Clock pulse 1 | Clock pulse 2 | Clock pulse 3 | Clock pulse 4 | Clock pulse 5 | Clock pulse 6 |
| 0 0 0 1 | 1111 | 1111 | 0011 | 0011 | 0010 | 0010 | 0000 |
| 0 0 1 0 | 1111 | 0101 | 0001 | 0001 | 0001 | 0001 | 0000 |
| 0 1 0 0 | 1111 | 1111 | 1111 | 1111 | 1010 | 0000 | 0000 |
| 1 0 0 0 | 1111 | 0101 | 0101 | 0101 | 0101 | 0000 | 0000 |
| 0 0 0 0 | 1111 | 1111 | 0011 | 0011 | 0010 | 0010 | 0010 |
| 0 0 0 0 | 1111 | 0101 | 0001 | 0001 | 0001 | 0001 | 0001 |
| 0 0 0 0 | 1111 | 1111 | 1111 | 1111 | 1010 | 1000 | 1000 |
| 0 0 0 0 | 1111 | 0101 | 0101 | 0101 | 0101 | 0100 | 0100 |

The result is correct if it coincides with the result of the calculation in the conventional position code.

Consider now an example of performance of a logical multiplication operation.

EXAMPLE 3

Assume that the module A contains the same words as in example 1, the first operand code in the register 3

Suppose we have two binary words — 101 and 011. The first word is placed in the register 3. The second word is stored in one of the modules 32 at the code 00001000 written in the memory elements 33 connected to a proper bus 35 of this module, i.e. the "1" code is stored in the element 33 at the intersection of the corresponding bus 35 and the address bus 34 with number 011, while all other elements 33 connected to this bus 35 store the code "0". The code 111 is placed into the register 6, for example, from the outputs 10 and 11 of the register 3 via the respective groups 8 of the circuits 7 controlled from the decoder 25. The mask code 110 is written into the register 22. The output signals of the registers 6 and 22 go through the groups 16 of OR circuits 15 to the input of the decoder 14 which causes excitation of the outputs 111, 101, 011, 001 of this decoder 14. The code 10101010 from the outputs of the decoder 14 is sent to the inputs 56 of the flip-flops 55 in the register 54 and is cyclically shifted through five positions when five pulses are applied from the output 58 of the register 3 to the inputs 57 of the flip-flops 55. The register 3 must be designed according to above patent. The code 01010101 appears at the outputs of the flip-flops 55. In accordance with this code, the 0th, 2nd, 4th and 6th buses 34 of the modules 32 are excited. The bus 35 of the module 32 that stores the second addend 00001000 produces a "0" signal, the first digit of the sum, which is transmitted via the circuit 47 to the input of the register 46 (provided four "0" signals are taken by the detector 43 as a "zero" signal). Further on, the code in the register 22 is cyclically shifted — 101, and the code 11001100 appears at the output of the decoder. This code is also shifted by the register 54 through five positions — 01100110, and the selected bus 35 produces a "0" signal, the second digit of the sum. At the third clock pulse interval the code in the register 22 is again cyclically shifted — 011, the code 11110000 appears at the decoder output, this code being shifted by the register 54 through five positions — 10000111, and a "0" signal, the third digit of the sum, appears at the selected bus 35. During the three clock pulse intervals of access to the device, two three-digit words are added up. Longer words are divided into several-digit groups (three digits in our example). Addition inside each group, i.e. addition of full words without taking into account carry from group to group, occurs in the course of clock pulse intervals the number of which is equal to the number of digits in each group. Carries between groups are effected as follows. The flip-flops 56 with their numbers exceeding the code in the register 3 (in this example, 111, 110, 101, 100) are set to the "1" state, the fourth, fifth, sixth and seventh buses 34 of the modules 32 are excited in accordance with the code 11110000, at the output of the register 54, and a carry signal appears at the selected bus 35 (in our example this signal is "0", i.e. there is no carry in this group). The carry signal is applied from the bus 35 via the circuit 47 to the input of the register 46, and from the output thereof is transmitted to the count input of the register 3 of the next more significant group. In the worst case, the number of clock pulse intervals required to produce carry signals will be equal to the number of the groups minus 1.

Similar to conventional adders, it is preferable to replace the subtraction operation by the addition operation with the complementary code of the second addend. It is also preferable to replace multiplication and division by successive addition and sub-traction operations.

This invention makes it possible to improve the performance of associative memory devices performing arithmetic and logical operations by one or two orders as compared with the known devices.

What is claimed is:

1. An associative memory designed to perform search and logical operations on attributive information presented in the form of multi-digit associative words which are sets of a given number of binary associative indications, comprising
   an input register to receive and store the code of the first operand, which is a given set of binary indications, having control outputs and
   flip-flops with an input, a direct output, and an inverse output,
   the number of said flip-flops of said input register being equal to the number of binary indications in said code of the first operand,
   said flip-flops of said input register being divided into groups;
   an interrogation register to receive and store the interrogation code in the form of a given set of binary indications made up of
   flip-flops with direct and inverse inputs, and direct and inverse outputs,
   the number of said flip-flops of said interrogation register being equal to the number of said flip-flops of said input register,
   said flip-flops of said interrogation register being divided into groups equal in number to said groups of said flip-flops of said input register;
   coincidence circuits which have first and second inputs and outputs,
   said coincidence circuits being arranged in groups, two of said coincidence circuits being in each group,
   the number of said coincidence circuits being equal to the number of said flip-flops of said input register,
   said first inputs of first and second coincidence dircuits in each said group being connected, respectively, to said direct and inverse outputs of said respective flip-flops of said input register,
   said outputs of said first and second coincidence circuits in each said group being connected, respectively, to said direct and inverse inputs of said respective flip-flop of said interrogation register;
   interrogation decoders for converting said interrogation code which have inputs and outputs;
   OR circuits which have first and second inputs and outputs,
   said OR circuits being arranged in groups, two OR circuits being in each group,
   the number of said OR circuits being equal to the number of said flip-flops of said input register,
   said first inputs of first and second OR circuits of each said group being connected, respectively, to said direct and inverse outputs of said respective flip-flop of said interrogation register,
   said outputs of said first and second OR circuits of each said group being connected to respective inputs of said interrogation decoders;
   a mask register to receive and store the mask code in the form of a given set of binary indications, which show said indications of said interrogation code irrelevant to the search operation to be performed, with
   flip-flops having inputs and direct outputs,
   the number of said flip-flops of said mask register being equal to the number of said flip-flops of said input register,
   said flip-flops of said mask register making up ring shift registers in a number equal to said groups of said flip-flops in said input register, said direct outputs of said flip-flops of said mask register being connected to said second inputs of said OR circuits of said respective group;

an operation decoder to control information transfer from said outputs of said flip-flops in said input register to said inputs of said respective flip-flops in said interrogation register in a direct code and inverse code, depending on the logical operation to be performed, having inputs and outputs, first and second outputs of said operation decoder being connected to said second inputs of, respectively, said first and second coincidence circuit in each said group of said coincidence circuits; and a data storage unit to perform arithmetic and parallel logical operations on attributive information having interrogation buses and control inputs, said interrogation buses of said data storage unit being connected to said outputs of said respective interrogation decoders, said control inputs of said data storage unit being connected to respective outputs of said operation decoder.

2. A memory as set forth in claim 1, wherein said data storage unit for performing arithmetic operations and parallel logical operations on attributive information comprises:

address memory modules which have address buses for data reading and writing, output digit buses for data reading, a data writing control input, a data reading control input, an information input, and write digit buses, the number of said write digit buses being equal to the number of said output digit buses;

a matrix for performing search and logical operations on attributive information written in said address memory modules made up of rows and columns of said address memory modules, the number of said rows in said matrix of said address memory modules being equal to the number of said groups of said flip-flops of said input register, the number of said columns in said matrix of said address memory modules being equal to the number of said associative words, said address memory modules of each said row in said matrix being arranged in groups, two modules being in each group, said address buses of said address memory modules of each said row in said matrix being connected through said interrogation buses to said outputs of said respective interrogation decoders; and modulo-2 adders for control of said write digit buses of said address memory modules having first and second inputs and outputs, said output digit buses of a first of said address memory modules in said group of said two address memory modules being connected to said first inputs of said modulo-2 adders of a second module in said group, whose outputs are connected to said write digit buses of said second address memory module of the group, said second inputs of said modulo-2 adders in each said row of said matrix and said information inputs, said data writing control inputs and said data reading control inputs of said address memory modules of each said column in said matrix being connected to respective outputs of said operation decoder;

said inputs of said operation decoder being connected to said direct outputs of said respective flip-flops of said input register.

3. A memory as set forth in claim 1, wherein said groups of said flip-flops of said input register make up shift registers.

4. A memory as set forth in claim 2, wherein said data storage unit for performing arithmetic operations and parallel logical operations on attributive information comprises:

address memory modules which have address buses for data reading and writing, output digit buses for data reading, a data writing control input, a data reading control input, an information input, and write digit buses, the number of said write digit buses being equal to the number of said output digit buses;

a matrix to perform search and logical operations on attributive information written in said address memory modules made up of rows and columns of said address memory modules, the number of said rows in said matrix of said address memory modules being equal to the number of said groups of said flip-flops in said input register, the number of said columns in said matrix of said address memory modules being equal to the number of said associative words, said address memory modules of each said row of said matrix being arranged in groups of two, said address buses of said address memory modules of each said row in said matrix being connected via said interrogation buses to said outputs of said respective interrogation decoders; and modulo-2 addres to control said write digit buses of said address memory modules having first and second inputs and outputs, said output digit buses of a first of said address memory modules in said group of said two address memory modules being connected to said first inputs of said modulo-2 adders of a second module in said group whose said outputs are connected to said write digit buses of said second address memory module in the same group, said second inputs of said modulo-2 adders in each said row of said matrix and said information inputs, said data writing control inputs and said data reading control inputs of said address memory modules in each said column of said matrix being connected to respective outputs of said operation decoder;

said inputs of said operation decoder being connected to said direct outputs of said respective flip-flops in said input register.

5. A memory as set forth in claim 1, wherein said data storage unit for performing arithmetic operations and parallel logical operations on attributive information comprises:

address memory modules with address buses for data reading and writing and output digit buses for data reading;

a matrix to perform search and logical operations on attributive information written in said address memory modules which is made up of rows and columns of said address memory modules, the number of said rows in said matrix of said address memory modules being equal to the number of said groups of said flip-flops in said input registers, the number of said columns in said matrix of said address memory modules being equal to the number of said associative words;

detectors for detecting the location of information with a given set of binary indications having inputs and outputs, said inputs of said detectors being connected to said output digit buses of said address memory modules of said respective column in said matrix;

an output register to receive and store information read out of said respective address memory modules with flip-flops having inputs and outputs, the number of said flip-flops of said output register being equal to the number of said flip-flops of said input register, said flip-flops of said output register being divided into groups equal in number to said groups of said flip-flops of said input register;

multi-input OR circuits which have first inputs, second inputs and outputs, said first inputs of said OR circuits being connected to said output digit buses of said address memory modules of a respective row in said matrix, said outputs of said OR circuits being connected to said inputs of respective flip-flops in said output register;

additional coincidence circuits which have first and second inputs and outputs, said additional coincidence circuits being arranged in groups, each group containing two of said coincidence circuits, the number of said groups of said additional coincidence circuits being equal to the number of said groups of said flip-flops in said input register, said first inputs of first and second additional coincidence circuits being connected, respectively, to said direct output and said inverse output of said respective flip-flop of said input register, said second inputs of said additional coincidence circuits being connected to respective outputs of said operation decoder, said outputs of said additional coincidence circuits said being connected to said second inputs of said respective multi-input OR circuits; and shift registers for shifting said code at said outputs of said interrogation decoders, the number of said shift registers being equal to the number of said groups of said flip-flops in said input register, each shift register having flip-flops having information inputs, clock pulse inputs and outputs, the number of said flip-flops of said shift registers being equal to the number of said outputs of said interrogation decoders, said information inputs of said flip-flops in each said shift register being connected via said interrogation buses to said like outputs of said respective interrogation decoder said clock pulse inputs of said flip-flops in said shift registers being connected to said respective control outputs of said input register, said outputs of said flip-flops in said shift registers being connected to said address buses of said address memory modules of said respective row in said matrix.

6. A memory as set forth in claim 5, wherein said groups of said flip-flops are designed as shift registers.

* * * * *